US007263604B2

(12) United States Patent
Gazsi et al.

(10) Patent No.: US 7,263,604 B2
(45) Date of Patent: Aug. 28, 2007

(54) HETEROGENEOUS PARALLEL MULTITHREAD PROCESSOR (HPMT) WITH LOCAL CONTEXT MEMORY SETS FOR RESPECTIVE PROCESSOR TYPE GROUPS AND GLOBAL CONTEXT MEMORY

(75) Inventors: Lajos Gazsi, Dusseldorf (DE); Jinan Lin, Ottobrunn (DE); Soenke Mehrgardt, Deisenhofen (DE); Xiaoning Nie, Neubiberg (DE)

(73) Assignee: Infineon Technologies AG, Munich (DE)

( * ) Notice: Subject to any disclaimer, the term of this patent is extended or adjusted under 35 U.S.C. 154(b) by 83 days.

(21) Appl. No.: 11/064,795

(22) Filed: Feb. 24, 2005

(65) Prior Publication Data

US 2005/0193186 A1 Sep. 1, 2005

(30) Foreign Application Priority Data

Feb. 27, 2004 (DE) ............ 10 2004 009 610

(51) Int. Cl.
*G06F 9/46* (2006.01)

(52) U.S. Cl. .......................... 712/228; 718/108

(58) Field of Classification Search ............. None
See application file for complete search history.

(56) References Cited

U.S. PATENT DOCUMENTS 5,361,337 A * 11/1994 Okin ............ 712/228
6,779,182 B1 * 8/2004 Zolnowsky ......... 718/103

6,915,414 B2 * 7/2005 Yearsley et al. ........... 712/219

FOREIGN PATENT DOCUMENTS

DE       10353268       7/2005

OTHER PUBLICATIONS

Kumar et al., "Single-ISA Heterogeneous Multi-Core Architectures: The Potential for Processor Power Reduction," *Proceedings of 36th Annual IEEE/ACM International Symposium on Microarchitecture*, Dec. 2003, pp. 81-92.
Ungerer et al., "A Survey of Processors with Explicit Multithreading," *ACM Computing Surveys*, ol. 35, No. 1, Mar. 2003, pp. 29-63.
German Office Action dated Nov. 2, 2004, no translation.
German Office Action dated Jul. 21, 2006, no translation.

* cited by examiner

*Primary Examiner*—Kenneth S. Kim
(74) *Attorney, Agent, or Firm*—Jenkins, Wilson, Taylor & Hunt, P.A.

(57) ABSTRACT

The invention relates to a heterogeneous parallel multithread processor (1) with shared contexts which has a plurality (M) of parallel-connected standard processor root unit types ($2_p$; $p \in [1, \ldots, M]$), where each respective standard processor root unit type ($2_p$) has at least one or more (K) parallel-connected standard processor root units ($2_{pq}$; $q \in [1, \ldots, K]$) for instruction execution of program instructions from various threads (T), each standard processor root unit type ($2_p$) having N local context memories ($32_{pt}$) which each buffer-store part of a current processor state for a thread. The multithread processor (1) also has a plurality (N) of global context memories ($3_t$; $t \in [1, \ldots, N]$) which each buffer-store part of a current processor state for a thread, and a thread control unit (4) which can connect any standard processor root unit ($2_{pq}$) to any global context memory ($3_t$).

35 Claims, 3 Drawing Sheets

HETEROGENEOUS PARALLEL MULTITHREAD PROCESSOR (HPMT) WITH LOCAL CONTEXT MEMORY SETS FOR RESPECTIVE PROCESSOR TYPE GROUPS AND GLOBAL CONTEXT MEMORY

TECHNICAL FIELD

The invention relates to a heterogeneous parallel multi-thread processor (HPMT) with shared contexts which has a plurality (M) of parallel-connected standard processor root unit types, where each respective standard processor root unit type has at least one or more (K) parallel-connected standard processor root units for instruction execution of program instructions from various threads, each standard processor root unit type having N local context memories which each buffer-store a current processor state for a local thread. The multithread processor (HPMT) also has a plurality of global context memories, which each buffer-store a current processor state for a global thread, and a thread control unit which can connect any standard processor root unit to any global context memory.

BACKGROUND ART

Embedded processors and their architectures are measured by their computation power, their power consumption, their throughput, their costs and their real-time capability. To increase the throughput and the processor speed, the principle of pipelining is put to use. The basic idea of pipelining is the division of arbitrary instructions or program instructions into processing phases of the same duration in time. A pipeline having various processing elements is possible when the processing of an instruction itself can be divided up into a plurality of phases with disjunct and successively performable process steps. The original two instruction execution phases of the Von Neumann model, namely instruction fetching and instruction processing, are divided further in this context, since this division into two phases proves to be too coarse for pipelining. The pipeline variant essentially applied for RISC processors contains four phases of instruction processing, namely instruction fetch, instruction decoding/operand fetch, instruction execution and writeback.

With regard to the instruction processing in a program code, a thread T denotes a control thread in the code or in the source code or in the program, there being data dependencies within a thread T and there being weak data dependencies between various threads T (as described in section 3 of T. Bayerlein, O. Hagenbruch: "Taschenbuch Mikroprozessortechnik" [Pocket book of microprocessor engineering], 2nd edition Fachbuchverlag Leipzig im Karl-Hanser-Verlag Munich—Vienna, ISBN 3-446-21686-3).

One property of a process is that a process always accesses a dedicated memory area. A process comprises a plurality of threads T. Accordingly a thread T is a program part of a process. A context of a thread is the processor state of a processor which processes this thread T or program instructions from this thread. Accordingly, the context of a thread is defined as a temporary processor state while this processor is processing the thread. The context is held by the hardware of the processor, namely the program count register or program counter, the register file or the context memory and the associated status register.

While a processor is executing a thread, a thread T may be temporarily blocked. Temporary blockage of a thread T may have various causes, for example as a result of a latency during access to an external memory or to an internal register.

A processor is temporarily blocked when the processor pipeline is able to process no further program instruction from a thread T.

To solve the problem of temporary blockage, "multithread processors" are known to be provided. A multithread processor is a processor which provides hardware for executing a plurality of contexts by respectively providing a program count register, a register bank and a status register for the plurality of contexts.

In line with one development of a multithread processor, based on a document which is unpublished by the applicant on the date of application, FIG. 1 shows a block diagram of a parallel multithread processor with shared contexts. The idea underlying the parallel multithread processor with shared contexts is not to divide the N threads or their corresponding N context memories into sets, as in the case of known multithread processors, with each of these sets being directly connected or wired to an associated standard processor root unit, but rather to provide the context memories such that any standard processor root unit can be connected to any context memory.

In this case, the program instructions from the N threads or from the N context memories are dynamically distributed to the M standard processor root units. The N context memories and M standard processor root units are coupled to one another by multiplexers. During execution of the respective program instruction in each pipeline stage of each respective processor or each respective standard processor root unit, the appropriate context is selected by means of a multiplexer. Each program instruction within the standard processor root unit requires the appropriate context. The appropriate context is selected using control signals <t,p>, where t denotes the thread number or thread index and p denotes the standard processor root number or the number of the standard processor root unit.

The parallel multithread processor PMT shown in FIG. 1 is coupled to an instruction memory BS and to a data bus DB. In addition, the multithread processor PMT contains M standard processor root units SPRE, N context memories KS, a thread control unit TK, M processor control units PKE, N instruction buffer stores BZS, N×M multiplexers N×M MUX and M×N multiplexers M×N MUX.

Each standard processor root unit SPRE has an instruction decoding/operand fetch unit BD/OHE, an instruction execution unit BAE and a writeback unit ZSE, these units being arranged to process program instructions in line with a pipeline process.

The instruction fetch unit BHE has an M×N multiplexer M×N MUX, N data lines DL, N instruction buffer stores BZS, a further N data lines DL and an N×M multiplexer N×M MUX.

Each standard processor root unit SPRE has an associated processor control unit PKE provided for it. A processor control unit PKE controls the appropriate standard processor root unit SPRE using internal control signals. A first internal control signal intSS' for the instruction decoding/operand fetch unit controls the instruction decoding/operand fetch unit BD/OHE in this case. A second internal control signal intSS" for the instruction execution unit controls the instruction execution unit BAE, and a third internal control signal intSS''' for the writeback unit controls the writeback unit ZSE.

Each context memory KS has a program count register PZR, a register bank RB and a status register SR. The program count register PZR buffer-stores a program counter for a thread T. An N×M multiplexer N×M MUX places the contents of the N program count registers PZR from N threads T onto an M-channel address bus AB.

The M program instructions referenced by the data contents of the program count registers PZR are read from the instruction memory BS by the instruction fetch unit BHE using an M-channel data bus DB. The data contents which have been read are transferred to N instruction buffer stores BZS by means of an M×N multiplexer M×N MUX. Each of the N threads T has an associated instruction buffer store BZS provided for it. An N×M multiplexer N×M MUX is used to place M program instructions from the N instruction buffer stores BZS onto M data lines DL. The M program instructions on the data lines DL are distributed over the M standard processor root units SPRE.

The instruction decoding/operand fetch unit BD/OHE-i in the standard processor root unit SPRE-i decodes a program instruction from the thread T-j, for example. The decoded program instruction from the thread T-j contains, inter alia, addresses for operands which are required for the subsequent instruction execution. The addressed data contents of the operands are stored in a context memory KS-j which is associated with the thread T-j, more precisely in the register bank RB-j of the associated context memory KS-j. An N×M multiplexer N×M MUX is used to transfer the data contents of the operands from the register bank RB-j of the context memory KS-j to the instruction decoding/operand fetch unit BD/OHE-i in the standard processor root unit SPRE-i, with the N×M multiplexer N×M MUX being controlled by the thread control unit TK using the multiplexer control signal $<t,p>^{[e]}$. The multiplexers are controlled by means of the multiplexer control signals $<t,p>$ such that the corresponding context memory KS-j is connected to the appropriate pipeline stage of the appropriate standard processor root unit SPRE-i.

The instruction execution unit BAE-i in the standard processor root unit SPRE-i executes the arithmetic and logic operation contained in the program instruction from the thread T-j using the operands which have been fetched from the register bank RB-j.

When the arithmetic and logic operation with the operands which have been fetched has been performed, the result of the operation or additional characters or flags are placed onto a data line DL by the writeback unit ZSE-i. The same data contents are potentially, in the case of a storage instruction, additionally placed onto a further data line DL. The M further data lines DL are provided for coupling the multithread processor PMT to the data bus DB. The data contents of the M results of the M standard processor root unit SPRE are transferred to external memories via the data bus DB.

An M×N multiplexer M×N MUX is used to take the result of the operation or additional characters or flags from the first data line DL and to transfer the result of the arithmetic and logic operation to the register bank RB-j of the context memory KS-j and additional characters to the status register SR-j of the context memory KS-j. The data contents of the N status registers SR are transferred to the M processor control units PKE by means of an N×M multiplexer N×M MUX. The processor control unit PKE-i takes the data contents of the status registers SR and calculates internal control signals, namely the internal control signal for the instruction decoding/operand fetch unit intSS', the internal control signal for the instruction execution unit intSS" and the internal control signal for the writeback unit intSS'".

The thread control unit TK uses the multiplexer control signals $<t,p>^{[a]}-<t,p>^{[f]}$ to control the N×M multiplexers N×M MUX and the M×N multiplexers M×N MUX. The multiplexer control signal $<t,p>$ indicates which thread T-j is processed by which standard processor root unit SPRE-i.

An N×M multiplexer N×M MUX has the function of placing the data from an N-channel data bus onto an M-channel data bus.

An M×N multiplexer M×N MUX has the function of placing the data from an M-channel data bus onto an N-channel data bus.

The M internal event control signals ESS' contain, inter alia, data about blocked threads T, internal interrupts, waiting times and exception event signals and make these data available to the thread control unit TK.

External event control signals ESS" are transferred to the thread control unit TK by external devices. Examples of these are external interrupts, which are generated by external devices.

A parallel multithread processor architecture has drawbacks when a task is to be processed which requires the use of various processors or various processor types. Such a task is called a heterogeneous task, since it comprises different threads, which should preferably be processed by processors of different types (e.g. general purpose processor, protocol processor etc.).

A parallel multithread processor is accordingly unsuitable for use as a multilayer network processor.

Even connecting a plurality of parallel multithread processors in parallel would not solve the aforementioned problem, since interprocessor communication between the individual parallel multithread processors would have a disadvantageous effect on the utilization level of the individual parallel multithread processors and the overall system. In the case of parallel-connected parallel multithread processors, the overall context or all of the context memories would again not be accessible by any standard processor root unit, which would increase the blocking probability for the parallel-connected parallel multithread processors.

SUMMARY OF THE INVENTION

It is therefore an object of the present invention to provide a heterogeneous parallel multithread processor which has a minimal blocking probability and a high throughput even in the case of heterogeneous tasks.

The idea underlying the present invention essentially involves the provision of a multithread processor which has various types of parallel-connected individual processors or various standard processor root unit types which are all able to access the same context or the same context memory, however. A multithread processor which has at least two different standard processor root unit types is called a heterogeneous multithread processor. As regards the task which is set or the thread which is to be executed, the multithread processor controls which processor type or which standard processor root unit type is preferably connected to the common context or context memory. Common context memories are also called global context memories and are distinguished in that all of the various processor types of the heterogeneous multithread processor can be connected to them. Threads which can be executed by any standard processor root unit type of the multithread processor are called global threads. In contrast to this, context memories which can be connected only to one specific standard processor root unit type of the multithread processor are called local context memories. It makes sense to provide local context memories, since specific tasks or local threads can be executed in appropriate fashion only by one specific standard processor root unit type.

In the present invention, the problem discussed above is solved, in particular, by producing a heterogeneous parallel multithread processor with shared contexts having:

(a) a plurality (M) of parallel-connected standard processor root unit types, where each respective standard processor root unit type has at least one or more parallel-connected standard processor root units for instruction execution of program instructions from various threads, with each standard processor root unit type having N local context memories which each buffer-store part of a current processor state for a thread;

(b) a plurality (N) of global context memories which each buffer-store part of a current processor state for a thread;

(c) and having a thread control unit which can connect any standard processor root unit to any global context memory.

One advantage of the present invention is that providing various standard processor root unit types (e.g. general purpose processor, protocol processor, etc.) which access common context memories or global context memories means that it is also possible to execute tasks or threads which advantageously require different types of standard processor root units. A further advantage is that this increases the utilization level of the global context memories and of the resources of the multithread processor. In addition, various standard processor root unit types' access to a common context or the connection to global context memories minimizes the intercommunication between the individual processor types. Minimized intercommunication between the processor types likewise results in a better utilization level for the multithread processor resources and in a higher performance level for the multithread processor. In addition, the use of various standard processor root unit types minimizes the blocking probability for the overall system.

The subclaims advantageously contain developments and improvements of the heterogeneous parallel multithread processor (HPMT) with shared contexts.

In line with one preferred development, each standard processor root unit has an instruction decoding/operand fetch unit for decoding a program instruction and for fetching operands addressed within the program instruction.

In line with a further preferred development, each standard processor root unit has an instruction execution unit for executing the decoded program instruction.

In line with a further preferred development, each standard processor root unit has a writeback unit for writing back operation results of the executed program instructions.

In line with a further preferred development, each standard processor root unit is coupled to an associated processor control unit.

In line with a further preferred development, each global context memory has a program count register for buffer-storing a program counter, a register bank for buffer-storing operands, and a status register for buffer-storing status flags.

In line with a further preferred development, the number (K*M) of standard processor root units is less than or equal to the number (N) of global context memories.

One advantage of this preferred development is that it means that there are sufficient program instructions from various threads available for the (K*M) standard processor root units at any time. This means that no or minimal latencies arise.

In line with a further preferred development, at least one instruction buffer store is provided which can be divided into N, addressable by the thread control unit, instruction buffer stores, each of the N instruction buffer stores being able to be connected to any standard processor root unit.

One advantage of this preferred development is that the N instruction buffer stores mean that program instructions from the N threads are available for the (K*M) standard processor root units at any time, as a result of which the blocking probability is minimized on account of reduced waiting times.

In line with a further preferred development, the instruction buffer stores can be connected to one or more instruction memories in order for the thread control unit to read program instructions, the program instructions read from the instruction memory being addressed by the program counters in the program count registers of the global context memories.

In line with a further preferred development, up to (K*M) program instructions can be read from the instruction buffer stores simultaneously.

In line with a further preferred development, the standard processor root units send the processed data to a data store via a data bus.

In line with a further preferred development, each standard processor root unit processes the program instructions supplied to it by the thread control unit sequentially in a pipeline process.

In line with a further preferred development, each standard processor root unit processes a supplied program instruction, if said instruction is not a data access instruction, within a predetermined number of clock cycles.

One advantage of this preferred development is that the predetermined number of clock cycles for processing a program instruction ensures the real-time capability of the overall system.

In line with a further preferred development, the number of instruction buffer stores provided corresponds to the number (N) of global context memories, each instruction buffer store being selected by a corresponding thread index, which means that each thread or context memory has a dedicated instruction buffer store provided for it, the instruction buffer store buffer-storing and forwarding program instructions preferably on the basis of the FIFO (First In—First Out) organization.

This has the advantage that the program instructions from each thread are present in sequence upstream of the standard processor root units. This minimizes the switching time when there is a thread change in the standard processor root unit.

In line with a further preferred development, the thread control unit receives event control signals at its input, buffer-stores internal states and generates multiplexer control signals at its output.

One advantage of this preferred development is that the addressing of the program instructions which have been read by the program count registers in the global context memories and the control thereof by the thread control unit using the multiplexer control signals mean that the filling of the instruction buffer store is controlled by the thread control unit on a clock-cycle-sensitive basis, i.e. the control is effected such that in any clock cycle each pipeline stage of each standard processor root unit is connected to the corresponding global context memory. The central control by the thread control unit allows optimized filling of the instruction buffer stores and hence minimization of blocking probabilities.

In line with a further preferred development, the event control signals comprise internal event control signals and external event control signals.

In line with a further preferred development, the internal event control signals are generated by the standard processor root units.

One advantage of this preferred development is that it means that the thread control unit receives data about what modes of operation the individual standard processor root units are in, so that the thread control unit can react accordingly to the various modes of operation of the individual standard processor root units. From these data, the thread control unit generates the multiplexer control signals, which are transferred on a clock-cycle-sensitive basis to the appropriate multiplexers for the purpose of controlling the multiplexers.

In line with a further preferred development, the external event control signals are generated by external devices, such as an interrupt or external memories.

In line with a further preferred development, each standard processor root unit type is part of a DSP processor, of a protocol processor or of a general purpose processor.

In line with a further preferred development, the instruction execution unit in a standard processor root unit is an arithmetic and logic unit or an address generator unit.

In line with a further preferred development, an instruction fetch unit is formed by a (K*M)×N multiplexer, N data lines, N instruction buffer stores, a further N data lines and an N×(K*M) multiplexer.

In line with a further preferred development, the instruction decoding/operand fetch unit decodes the program instruction and fetches operands which are potentially addressed within the program instruction from the global context memories selected by means of the multiplexer control signals or from the local context memory for further processing.

In line with a further preferred development, the thread control unit has a switching network which actuates the thread control unit on the basis of the event control signals. In this case, the thread control unit supports the following functionalities:

The thread control unit decides which threads are executed, so that program instructions from these threads are fetched from the instruction memory by the instruction fetch unit. In order for the instruction fetch unit to fetch a plurality of program instructions from a plurality of threads from the instruction memory simultaneously, the thread control unit provides the appropriate thread numbers t, the appropriate type indices p and the appropriate standard processor root unit indices q and generates the multiplexer control signals therefrom.

In line with a further preferred development, the switching network in the thread control unit has at least one thread index buffer store which stores a queue of threads for execution, with a thread having at least the thread index and the corresponding thread state (ready, waiting) provided for it.

In line with a further preferred development, the switching network in the thread control unit has at least one standard processor root number buffer store which buffer-stores the type index and the standard processor root unit index, the thread control unit using the type index and the standard processor root unit index to address a corresponding standard processor root unit for the purpose of executing program instructions.

In line with a further preferred development, the type index and the standard processor root unit index form a standard processor root unit number.

One advantage of this preferred development is that the standard processor root unit number formed allows any standard processor root unit of any standard processor root unit type to be addressed explicitly.

In line with a further preferred development, the thread index buffer store and the standard processor root number buffer store are respectively in the form of a FIFO (First In—First Out) memory.

In line with a further preferred development, the thread index, which references a particular thread, is buffer-stored in the thread index buffer store in the thread control unit on the basis of the event control signals if the particular thread is not being processed by a standard processor root unit.

In line with a further preferred development, no more than N thread indices are fetched, on the basis of the event control signals, from the thread index buffer store using the switching network for the purpose of providing N fetched thread indices and for the purpose of executing program instructions from the N threads.

In line with a further preferred development, the standard processor root unit number addresses a particular standard processor root unit and is buffer-stored in the standard processor root unit number buffer store on the basis of the event control signals if no program instructions from a thread are being processed by the corresponding standard processor root unit.

In line with a further preferred development, no more than (K*M) standard processor root unit numbers are fetched, on the basis of the event control signals, from the standard processor root unit number buffer store using the switching network, which means that program instructions are executed by the standard processor root units addressed using the standard processor root unit number.

In line with a further preferred development, the thread control unit uses the thread index fetched from the thread index buffer store and the standard processor root unit numbers fetched from the standard processor root number buffer store to generate a multiplexer control signal, which means that the program instructions from the thread referenced by means of the fetched thread index are executed by the standard processor root units referenced by means of the fetched standard processor root unit number.

In line with a further preferred development, the multiplexer control signal respectively controls the N×(K*M) multiplexers and the (K*M)×N multiplexers in the respective corresponding clock cycle when the address of the program instruction or the program instruction from the thread referenced by means of the thread index which (thread) is executed by the standard processor root units referenced by means of the standard processor root unit number is at the appropriate location in the multithread processor.

In line with a further preferred development, contents of a global context memory can be executed by any standard processor root unit of any standard processor root unit type, and contents of a local context memory can be executed exclusively by the standard processor root units of the standard processor root unit type which is coupled to the local context memory.

In line with a further preferred development, a local context memory has a local register bank for buffer-storing operands and a local status register for buffer-storing status flags.

Exemplary embodiments of the invention are illustrated in the drawings and are explained in more detail in the description below. Identical reference symbols in the figures denote elements which are the same or have the same function.

DETAILED DESCRIPTION OF THE INVENTION

Although the present invention is described below with reference to processors or microprocessors or their architectures, it is not limited thereto, but rather can be used in a wide variety of ways.

Figure 1:
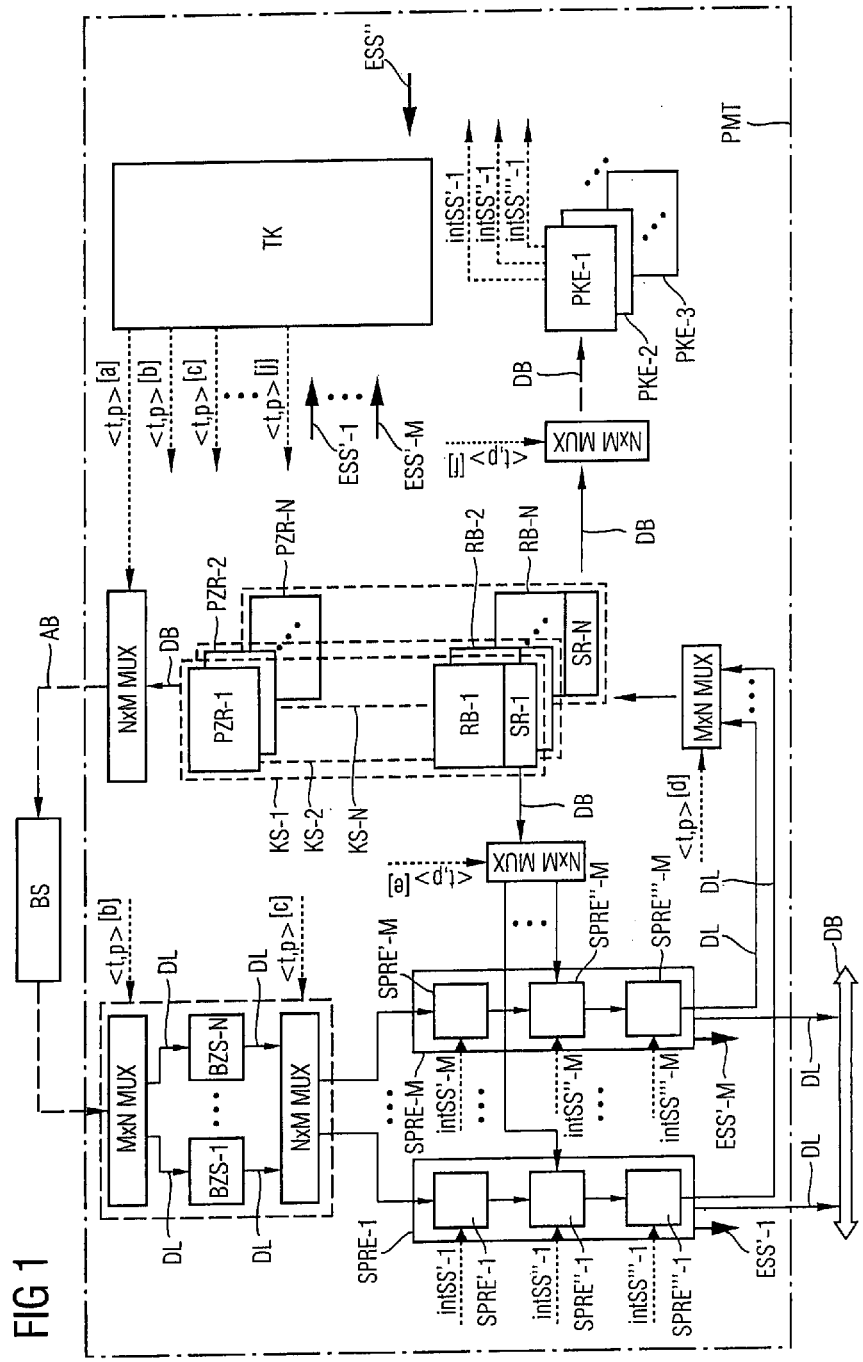
FIG. 1 shows a block diagram of a parallel multithread processor with the shared contexts.
Figure 2:
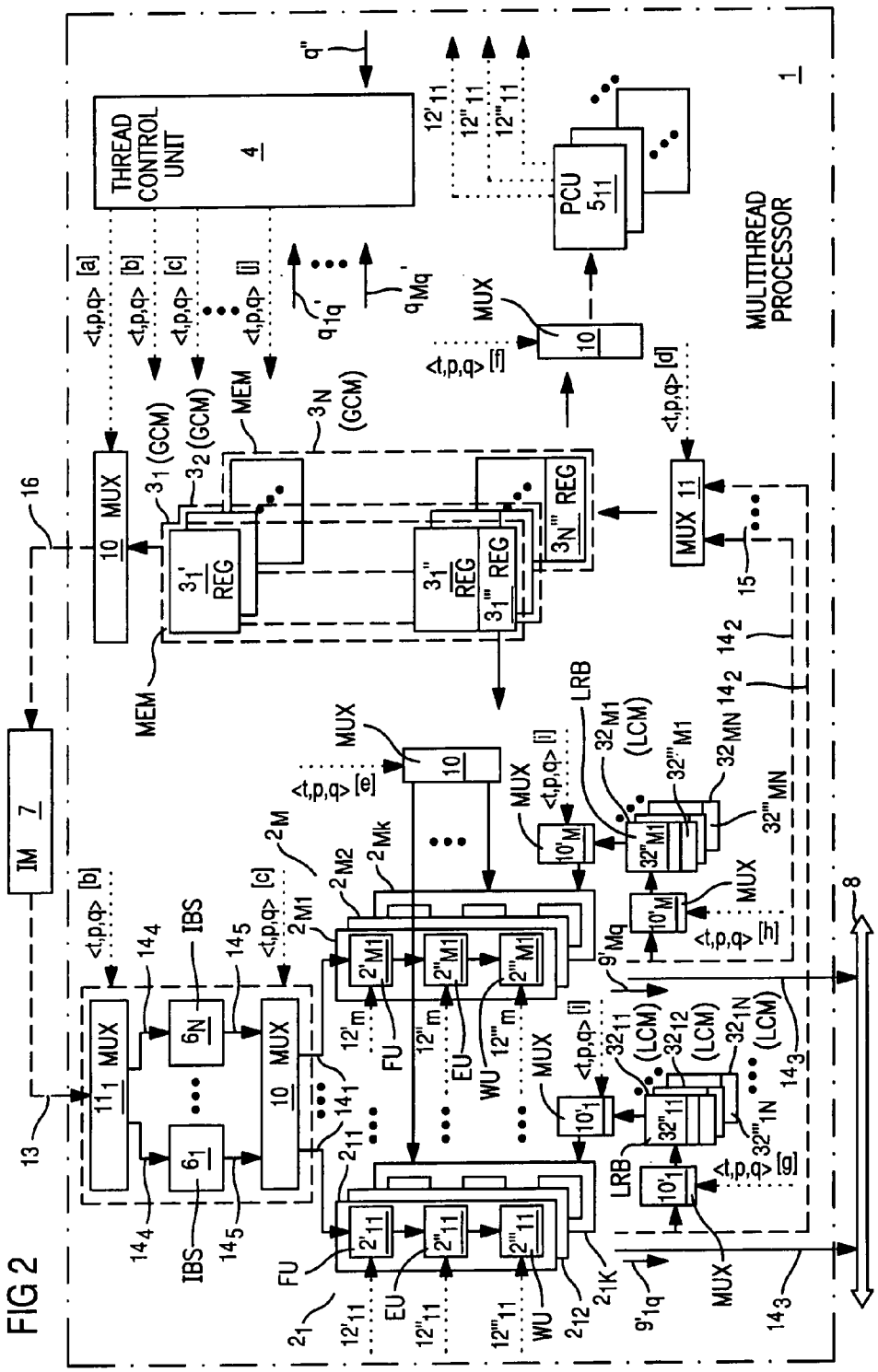
FIG. 2 shows a block diagram of a heterogeneous parallel multithread processor with shared contexts based on the present invention.

FIG. 2 shows a block diagram of a heterogeneous parallel multithread processor with shared contexts based on the present invention. In this case, reference symbol 1 denotes the heterogeneous parallel multithread processor, which is coupled to an instruction memory 7 and to a data bus 8. In addition, the multithread processor 1 contains M different standard processor root unit types $2_p$, where $p \in [1, \ldots, M]$. Each standard processor root unit type $2_p$ has one or more K parallel-connected standard processor root units $2_{pq}$, where $q \in [1, \ldots, M]$. Each standard processor root unit type $2_p$ is coupled to N local context memories $32_{pt}$. The multithread processor 1 also has M global context memories $3_t$, where $t \in [1, \ldots, N]$. Each standard processor root unit $2_{pq}$ is coupled to a processor control unit $5_{pq}$. The multithread processor 1 also has N instruction buffer stores $6_t$, $N \times (K*M)$ multiplexers 10 and $(K*M) \times N$ multiplexers 11.

The number K of standard processor root units $2_{pq}$ of a particular standard processor root unit type $2_p$ is dependent on the number K of standard processor root units $2_{pq}$ of each other standard processor root unit $2_p$. The number M of different standard processor root unit types $2_p$ is freely configurable, and the number K of standard processor root units $2_{pq}$ of a particular standard processor root unit type $2_p$ is freely configurable. Thus, by way of example, the multithread processor 1 of the standard processor root unit type $2_1$ (p=1), in the form of a DSP processor, may have two units $2_{11}$, $2_{12}$, and the multithread processor 1 of the standard processor root unit type $2_2$ (p=2), in the form of a protocol processor, may have three units $2_{21}$, $2_{22}$, $2_{23}$. Hence, N, M, K are maximum numbers which can be set up in hardware for the multithread processor 1, and t, p, q are variables for addressing the individual units within the multithread processor 1.

Each standard processor root unit $2_{pq}$ has an instruction decoding/operand fetch unit $2_{pq}'$, an instruction execution unit $2_{pq}''$ and a writeback unit $2_{pq}'''$, the instruction decoding/operand fetch unit $2_{pq}'$, the instruction execution unit $2_{pq}''$ and the writeback unit $2_{pq}'''$ being arranged for the purpose of processing instructions on the basis of a pipeline process.

The instruction fetch unit 17 has a $(K*M) \times N$ multiplexer 11, N data lines $14_4$, N instruction buffer stores $6_t$, a further N data lines $14_5$ and an $N \times (K*M)$ multiplexer 10.

The processor control unit $5_{pq}$ controls the coupled standard processor root unit $2_{pq}$ using internal control signals $12_{pq}'$, $12_{pq}''$, $12_{pq}'''$. A first internal control signal $12_{pq}'$ for the instruction decoding/operand fetch unit controls the instruction decoding/operand fetch unit $12_{pq}''$ in this case. A second internal control signal $12_{pq}''$ for the instruction execution unit controls the instruction execution unit $2_{pq}''$ and a third internal control signal $12_{pq}'''$ for the writeback unit controls the writeback unit $2_{pq}'''$.

Each global context memory $3_t$ has a program count register $3_t'$, a register bank $3_t''$ and a status register $3_t'''$. The program count register $3_t'$ stores a program counter for a thread T. An $N \times (K*M)$ multiplexer 10 is used to place the contents of the N program count registers $3_t'$ for the N threads T onto a $(K*M)$-channel address bus 16.

The $(K*M)$ program instructions from threads T which (program instructions) are referenced by the data contents of the program count registers $3_t'$ are read from the instruction memory 7 by the instruction fetch unit 17 via a $(K*M)$-channel data bus 13. The data contents which have been read are transferred to N instruction buffer stores $6_t$ via a $(K*M) \times N$ multiplexer 11. Each of the N threads T has an associated instruction buffer store $6_t$ provided for it. An $N \times (K*M)$ multiplexer 10 is used to place $(K*M)$ program instructions from the N instruction buffer stores $6_t$ onto $(K*M)$ data lines $14_1$. The $(K*M)$ program instructions which have been placed onto the data lines $14_1$ are distributed over the $(K*M)$ standard processor root units $2_{pq}$.

The global context memories $3_t$ store parts of threads or threads in a manner which is not specific to type. In contrast to this, the local context memories $32_{pt}$ store parts of threads in a manner which is specific to type. The local context memory $32_{pt}$ has a local register bank $32_{pt}''$ for buffer-storing operands and a local status register $32_{pt}'''$ for buffer-storing status flags. The local context memories $32_{pt}$ have both their inputs and their outputs coupled to the appropriate standard processor root unit type $2_p$ by means of a respective $K \times K$ multiplexer $10_p'$.

The instruction decoding/operand fetch unit $2_{pq}'$ in the standard processor root unit $2_{pq}$ decodes an instruction from the thread $T_t$, for example. The decoded program instruction from the thread $T_t$ contains, inter alia, addresses for operands which are required for the subsequent instruction execution. The addressed data contents or operands are stored in a context memory $3_t$ provided for the thread $T_t$, more precisely in the register bank $3_t'$ in the context memory $3_t$. An $N \times (K*M)$ multiplexer 10 is used to transfer the data contents of the operands from the register bank $3_t'$ to the instruction decoding/operand fetch unit $2_{pq}'$ in the standard processor root unit $2_{pq}$, the $N \times (K*M)$ multiplexer 10 being controlled by the thread control unit 4 using the multiplexer control signal $<t,q>^{[e]}$. The multiplexers (10, 11) are controlled by means of the multiplexer control signals $<t,p,q>$ such that the correct context memory $3_t$ is connected to the appropriate pipeline of the correct standard processor root unit $2_{pq}$. The instruction execution unit $2_{pq}''$ in the standard processor root unit $2_{pq}$ executes the arithmetic and logic operation contained in the instruction from the thread $T_t$ using the operands fetched from the register $3_t$.

When the arithmetic and logic operation has been performed using the fetched operands, the result of the operation or additional characters or flags is placed onto a data line $14_2$ by the writeback unit $2_{pq}'''$.

The same data contents are potentially, in the case of a storage instruction, additionally placed onto a data line $14_3$. The $(K*M)$ data lines $14_3$ are provided for coupling the multithread processor 1 to the data bus 8. The data contents of the (K*M) results from the (K*M) standard processor root units $2_{pq}$ are transferred to an external memory via the data bus 8.

An (K*M)×N multiplexer 11 is used to take the result of the operation for the thread $T_t$ or additional characters or flags from the data line $14_2$ and to transfer the result of the arithmetic and logic operation to the register bank $3_t'$ of the context memory $3_t$ and additional characters or flags to the status register $3_t''$ of the context memory $3_t$.

The data contents of the N status registers $3_t'''$ are transferred to the (K*M) processor control units $5_{pq}$ by means of an N×(K*M) multiplexer 10. The processor control unit $5_{pq}$ takes the data contents of the status registers $3_t'''$ and generates internal control signals, namely an internal control signal for the instruction decoding/operand fetch unit $12_{pq}'$, an internal control signal for the instruction execution unit $12_{pq}''$ and an internal control signal for the writeback unit $2_{pq}'''$.

The thread control unit 4 uses the multiplexer control signals $<t,p,q>^{[a]}-<t,p,q>^{[j]}$ to control the multiplexers 10 and 11. A multiplexer control signal $<t,p,q>$ indicates which thread $T_t$ is processed by which standard processor root unit $2_{pq}$, where t is a thread index for the respective thread T, p is a type index for the respective standard processor root unit type $2_p$, and q is a standard processor root unit index for the respective standard processor root unit $2_{pq}$.

The N×(K*M) multiplexer 10 has the function of placing the data from an N-channel data bus onto a (K*M)-channel data bus.

The (K*M)×N multiplexer 11 has the function of placing the data from a (K*M)-channel data bus onto an N-channel data bus.

The (K*M) internal event control signals $9_{pq}'$ contain, inter alia, data about blocked threads T, internal interrupts, waiting times and exception event signals and make these data available to the thread control unit.

External event control signals 9" are made available to the thread control unit by external devices. Examples of these are external interrupts, which are generated by external devices.

Figure 3:
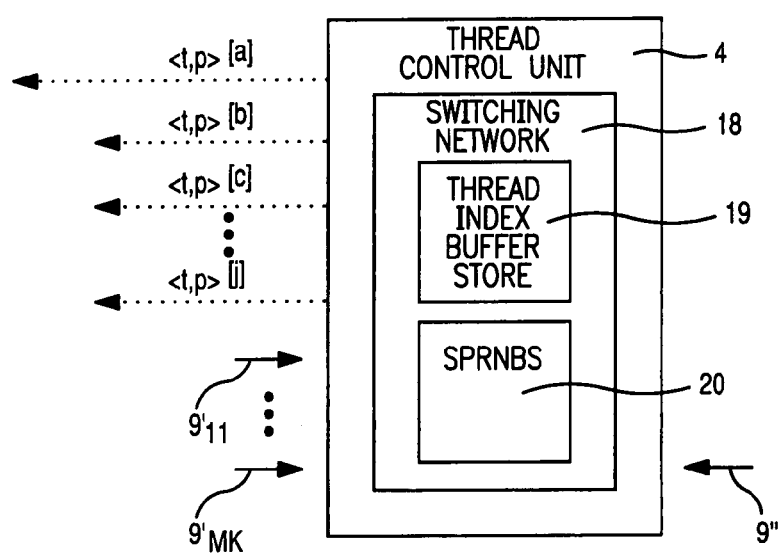
FIG. 3 shows a schematic block diagram of the thread control unit in the inventive heterogeneous parallel multithread processor with shared contexts.

FIG. 3 shows a schematic block diagram of the thread control unit in the inventive heterogeneous parallel multithread processor with shared context.

The thread control unit 4 has a switching network 18, a thread index buffer store 19 and a standard processor root number buffer store 20.

The thread index buffer store 19 buffer-stores the thread indices t. The standard processor root number buffer store 20 buffer-stores the standard processor root unit numbers pq, these respectively being generated from the type index p and from the standard processor root unit index q.

The input of the thread control unit 4 receives the internal event control signals $9_{pq}'$ ($9_{11}',\ldots,9_{MK}'$) and the external event control signals 9". The control signals received at the input are processed now and then by means of the switching network 18, the thread index buffer store 19 and the standard processor root number buffer store 20. The processing generates the multiplexer control signals $<t,p,q>^{[a]}-<t,p,q>^{[j]}$ and sends them to the appropriate N×(K*M) multiplexer 10 (not shown) or to the appropriate (K*M)×N multiplexer 11 (not shown) in the appropriate clock cycle.

Although the present invention has been described above with reference to preferred exemplary embodiments, it is not limited thereto but rather may be modified in a wide variety of ways.

| List of reference symbols | |
|---|---|
| 1 | Multithread processor |
| M | Number of different standard processor root unit types (SPRET) |
| p | Type index; p ∈ [1, . . . , M] |
| N | Number of different global context memories |
| t | Thread index; t ∈ [1, . . . , N] |
| K | Number of standard processor root units (SPRE) of the respective SPRET |
| q | Standard processor root unit index; q ∈ [1, . . . , K] |
| $p_q$ | Standard processor root unit number |
| T | Thread |
| $2_p$ | Standard processor root unit type (SPRET); p ∈ 1, . . . , M] |
| $2_{pq}$ | q-th SPRE of the SPRET p; p ∈ [1, . . . , M] |
| $2_{pq}'$ | Instruction decoding/operand fetch unit |
| $2_{pq}''$ | Instruction execution unit |
| $2_{pq}'''$ | Writeback unit |
| $3_t$ | t-th global context memory; t ∈ [1, . . . , N] |
| $3_t'$ | t-th program count register; t ∈ [1, . . . , N] |
| $3_t''$ | t-th register bank; t ∈ [1, . . . , N] |
| $3_{th}'''$ | t-th status register; t ∈ [1, . . . , N] |
| $32_{pt}$ | Local context memory for SPRE |
| $32_{pt}''$ | Local register bank for SPRE |
| $32_{pt}'''$ | Local status registers for SPRE |
| 4 | Thread control unit |
| $5_{pq}$ | Processor control unit |
| $6_t$ | Instruction buffer store |
| 7 | Instruction memory |
| 8 | Data bus |
| 9 | Event control signals |
| $9_{pq}'$ | Internal event control signal |
| 9" | External event control signals |
| 10 | N×(K*M) multiplexer |
| $10_p'$ | K×K multiplexer • |
| 11 | (K*M)×N multiplexer |
| 12 | Internal control signal |
| $12_{pq}'$ | Internal control signal for instruction decoding/operand fetch unit |
| $12_{pq}''$ | Internal control signal for instruction execution unit |
| $12_{pq}'''$ | Internal control signal for writeback unit |
| <t, p, q> | Multiplexer control signal |
| 13 | (K*M)-channel data bus |
| 14 | Data line |
| 15 | N-channel data bus |
| 16 | (K*M)-channel address bus |
| 17 | Instruction fetch unit |
| 18 | Switching network |
| 19 | Thread index buffer store |
| 20 | Standard processor root number buffer store |
| PMT | Parallel multithread processor |
| SPRE | Standard processor root unit |
| SPRE' | Instruction decoding/operand fetch unit |
| SPRE" | Instruction execution unit |
| SPRE'" | Writeback unit |
| KS | Context memory |
| PZR | Program count register |
| RB | Register bank |
| SR | Status register |
| TK | Thread control unit |
| PKE | Processor control unit |
| BZS | Instruction buffer store |
| BS | Instruction memory |
| DB | Data bus |
| ESS | Event control signals |
| ESS' | Internal event control signal |
| ESS" | External event control signals |
| NxM MUX | NxM multiplexer |
| MxN Mux | MxN multiplexer |
| intSS | Internal control signal |
| intSS' | Internal control signal for instruction decoding/operand fetch unit |
| intSS" | Internal control signal for instruction |

-continued

| | List of reference symbols |
|---|---|
| | execution unit |
| intSS''' | Internal control signal for writeback unit |
| t | Thread number |
| p | Standard processor root number |
| <t, p> | Multiplexer control signal |
| DB | Data bus |
| AD | Address bus |
| DL | Data line |
| BHE | Instruction fetch unit |

What is claimed is:

1. A heterogeneous parallel multithread processor with shared contexts, the processor comprising:
 (a) a plurality of parallel-connected standard processor root unit types, where each respective standard processor root unit type has at least one or more parallel-connected standard processor root units for instruction execution of program instructions from various threads, wherein each standard processor root unit has at least an instruction decoding/operand fetch unit and an instruction unit, wherein each standard processor root unit type has N local context memories which each buffer-store part of a current processor state for a thread, wherein the local context memories are connected only to the respective standard processor root unit type;
 (b) a plurality of global context memories which each buffer-store part of a current processor state for a thread, wherein the global context memories are connected to all standard processor root unit types, wherein each context memory includes at least one register; and
 (c) a thread control unit which generates multiplexer control signals for controlling multiplexers with which any standard processor root unit can be connected to any global context memory.

2. The multithread processor as claimed in claim 1, wherein each standard processor root unit has an instruction decoding/operand fetch unit for decoding a program instruction and for fetching operands addressed within the program instruction.

3. The multithread processor as claimed in claim 1, wherein each standard processor root unit has an instruction execution unit for executing the decoded program instruction.

4. The multithread processor as claimed in claim 1, wherein each standard processor root unit has a writeback unit for writing back operation results of the executed program instructions.

5. The multithread processor as claimed in claim 1, wherein each standard processor root unit is coupled to an associated processor control unit.

6. The multithread processor as claimed in claim 1, wherein each global context memory has
 (a) a program count register for buffer-storing a program counter,
 (b) a register bank for buffer-storing operands, and a status register for buffer-storing status flags.

7. The multithread processor as claimed in claim 1, wherein the number of standard processor root units is less than or equal to the number of global context memories.

8. The multithread processor as claimed in claim 1, wherein at least one instruction buffer store is provided which can be divided into N, addressable by the thread control unit, instruction buffer stores, each of the N instruction buffer stores being able to be connected to any standard processor root unit.

9. The multithread processor as claimed in claim 1, wherein the instruction buffer stores can be connected to one or more instruction memories in order for the thread control unit to read program instructions, the program instructions read from the instruction memory being addressed by the program counters in the program count registers of the global context memories.

10. The multithread processor as claimed in claim 1, wherein up to program instructions can be read from the instruction buffer stores simultaneously.

11. The multithread processor as claimed in claim 1, wherein the standard processor root units send the processed data to a data store via a data bus.

12. The multithread processor as claimed in claim 1, wherein each standard processor root unit processes the program instructions supplied to it by the thread control unit sequentially in a pipeline process.

13. The multithread processor as claimed in claim 1, wherein each standard processor root unit processes a supplied program instruction, if said instruction is not a data access instruction, within a predetermined number of clock cycles.

14. The multithread processor as claimed in claim 1, wherein the number of instruction buffer stores provided corresponds to the number of global context memories, each instruction buffer store being actuated by a corresponding thread index.

15. The multithread processor as claimed in claim 1, wherein the thread control unit receives event control signals at its input, buffer-stores internal states and provides multiplexer control signals at its output.

16. The multithread processor as claimed in claim 1, wherein the event control signals comprise internal event control signals and external event control signals.

17. The multithread processor as claimed in claim 1, wherein the internal event control signals are generated by the standard processor root units.

18. The multithread processor as claimed in claim 1, wherein the external event control signals are generated by external modules.

19. The multithread processor as claimed in claim 1, wherein each standard processor root unit type is part of a DSP processor, of a protocol processor or of a general purpose processor.

20. The multithread processor as claimed in claim 1, wherein the instruction execution unit in the standard processor root unit is an arithmetic and logic unit or an address generator unit.

21. The multithread processor as claimed in claim 1, wherein an instruction fetch unit is formed by a multiplexer, N data lines, N instruction buffer stores, a further N data lines and a multiplexer.

22. The multithread processor as claimed in claim 1, wherein the instruction decoding/operand fetch unit decodes the program instruction and fetches operands which are potentially addressed within the program instruction from the global context memories selected by means of the multiplexer control signals or from the local context memory for further processing.

23. The multithread processor as claimed in claim 1, wherein the thread control unit has a switching network which actuates the thread control unit on the basis of the event control signals.

24. The multithread processor as claimed in claim 1, wherein the switching network in the thread control unit has at least one thread index buffer store which stores a queue of threads for execution, with a thread having at least the thread index and the corresponding thread state provided for it.

25. The multithread processor as claimed in claim 1, wherein the switching network in the thread control unit has at least one standard processor root number buffer store which buffer-stores the type index and the standard processor root unit index, the thread control unit using the type index and the standard processor root unit index to address a corresponding standard processor root unit for the purpose of executing program instructions.

26. The multithread processor as claimed in claim 1, wherein the type index and the standard processor root unit index form a standard processor root unit number.

27. The multithread processor as claimed in claim 1, wherein the thread index buffer store and the standard processor root number buffer store are respectively in the form of a FIFO memory.

28. The multithread processor as claimed in claim 1, wherein the thread index, which addresses a thread, is buffer-stored in the thread index buffer store in the thread control unit on the basis of the event control signals if the thread is not being processed by a standard processor root unit.

29. The multithread processor as claimed in claim 1, wherein no more than N thread indices are fetched, on the basis of the event control signals, from the thread index buffer store using the switching network for the purpose of providing N fetched thread indices and for the purpose of executing program instructions from the N threads.

30. The multithread processor as claimed in claim 1, wherein the standard processor root unit number addresses a particular standard processor root unit and is buffer-stored in the standard processor root number buffer store on the basis of the event control signals if no program instructions from a thread are being processed by the particular standard processor root unit.

31. The multithread processor as claimed in claim 1, wherein no more than standard processor root unit numbers are fetched, on the basis of the event control signals, from the standard processor root number buffer store using the switching network, which means that program instructions are executed by the standard processor root units addressed using the standard processor root unit number.

32. The multithread processor as claimed in claim 1, wherein the thread control unit uses a thread index fetched from the thread index buffer store and a standard processor root unit number fetched from the standard processor root number buffer store to generate a multiplexer control signal and hence controls the multiplexers, which means that the program instructions from the thread referenced by means of the fetched thread index are executed by the standard processor root unit referenced by means of the fetched standard processor root unit number.

33. The multithread processor as claimed in claim 1, wherein the multiplexer control signal respectively controls the multiplexers and the multiplexers in the respective corresponding clock cycle when the address of the program instruction or the program instruction from the thread referenced by means of the thread index which is executed by the standard processor root unit referenced by means of the standard processor root unit number is at the appropriate location in the multithread processor.

34. The multithread processor as claimed in claim 1, wherein contents of a global context memory can be executed by any standard processor root unit of any standard processor root unit type, and wherein contents of a local context memory can be executed exclusively by the standard processor root units of the standard processor root unit type which is coupled to the local context memory.

35. The multithread processor as claimed in claim 1, wherein a local context memory has a local register bank for buffer-storing operands and a local status register for buffer-storing status flags.

* * * * *